(12) United States Patent
Woods et al.

(10) Patent No.: US 11,424,970 B1
(45) Date of Patent: Aug. 23, 2022

(54) CONVERTING GMSK IMPULSE RESPONSES AND OPTIMAL SEQUENCES

(71) Applicant: Rockwell Collins, Inc., Cedar Rapids, IA (US)

(72) Inventors: Matthew Woods, Ottawa (CA); Scott A. Klassen, Kanata (CA); Mark B. Jorgenson, Kanata (CA); Kenneth W. Moreland, Kemptville (CA)

(73) Assignee: Rockwell Collins, Inc., Cedar Rapids, IA (US)

(*) Notice: Subject to any disclaimer, the term of this patent is extended or adjusted under 35 U.S.C. 154(b) by 0 days.

(21) Appl. No.: 17/460,465

(22) Filed: Aug. 30, 2021

(51) Int. Cl.
| | | |
|---|---|---|
| *H04L 27/00* | (2006.01) | |
| *H04L 25/02* | (2006.01) | |
| *H04L 27/38* | (2006.01) | |
| *H04L 27/20* | (2006.01) | |
| *H04L 27/22* | (2006.01) | |
| *H04B 1/7115* | (2018.01) | |

(52) U.S. Cl.
CPC ........ *H04L 27/0008* (2013.01); *H04B 1/7115* (2013.01); *H04L 25/0212* (2013.01); *H04L 27/2017* (2013.01); *H04L 27/22* (2013.01); *H04L 27/38* (2013.01)

(58) Field of Classification Search
CPC ............. H04L 27/0008; H04L 25/0212; H04L 27/2017; H04L 27/22; H04L 27/38; H04B 1/7115
See application file for complete search history.

(56) References Cited

U.S. PATENT DOCUMENTS

| 5,966,055 | A | 10/1999 | Knoedl et al. | |
|---|---|---|---|---|
| 6,400,928 | B1* | 6/2002 | Khullar | H04L 27/2017 455/67.11 |
| 7,515,652 | B2* | 4/2009 | Jensen | H04L 27/2017 375/135 |
| 7,860,188 | B2 | 12/2010 | Jensen | |
| 8,009,761 | B2 | 8/2011 | Lai et al. | |

(Continued)

FOREIGN PATENT DOCUMENTS

| EP | 0477175 B1 | 8/1994 |
|---|---|---|
| EP | 0561258 B1 | 8/2001 |

(Continued)

OTHER PUBLICATIONS

Huang, Kaibin. (2005). Supplementary Proof for "Exact and Approximate Construction of Digital Phase Modulations by Superposition of AMP" by P. A. Laurent. Communications, IEEE Transactions on. 53. 234-237. 10.1109/TCOMM.2004.841979.

(Continued)

*Primary Examiner* — Vineeta S Panwalkar
(74) *Attorney, Agent, or Firm* — Suiter Swantz pc llo

(57) ABSTRACT

Optimal GMSK training sequences are generated by applying a base sequence to the in-phase component of the even samples and rotating the base sequence by $2^{k-1}$ and applying the second sequence to the quadrature component of the odd samples. Using the optimal GMSK training sequence a channel estimate can be generated. Filtering the channel estimate converts the channel impulse response to one that can be used with a non-GMSK signal e.g. PSK or QAM.

20 Claims, 9 Drawing Sheets

(56) References Cited

U.S. PATENT DOCUMENTS

2008/0226000 A1\* 9/2008 Meyer ........................ H04L 1/20
375/346

FOREIGN PATENT DOCUMENTS

| IN | 348830 B | 10/2020 |
| --- | --- | --- |
| RU | 2700172 C1 | 9/2019 |

OTHER PUBLICATIONS

Laurent, P., "Exact and Approximate Construction of Digital Phase Modulations by Superposition of Amplitude Modulated Pulses (AMP)," in IEEE Transactions on Communications, vol. 34, No. 2, pp. 150-160, Feb. 1986.

Wu, Yik-Chung & Ng, T.s. (2000). New implementation of a GMSK demodulator in linear software radio receiver. 2. 1049-1053 vol. 2. 10.1109/PIMRC.2000.881581.

\* cited by examiner

CONVERTING GMSK IMPULSE RESPONSES AND OPTIMAL SEQUENCES

BACKGROUND

There are a number of conditions where a signal that has been transmitted would be received with an equalizer. An equalizer uses an estimate of the channel impulse response (CIR) to compute a least-squares estimate of the received signal. The estimation of the channel impulse response depends on the type of modulation that was transmitted. Gaussian minimum-shift keying (GMSK) and phase-shift keying (PSK)/quadrature amplitude modulation (QAM) are two different types of modulations that have complementary properties.

GMSK is a binary coding scheme that is spectrally efficient allowing a higher symbol rate and a shorter filter to meet spectral emission masks. A shorter filter allows lower latency of the signal through the radio. GMSK allows peak to average power to be very small such that more average power can be transmitted with amplifiers that are peak power limited, increasing the signal to noise ratio. Amplifiers do not need to be as linear which simplifies amplifier design and reduces power requirements which is beneficial for low power and battery powered applications.

PSK/QAM modulations allow more than one bit per symbol which can dramatically increase the data rate at the same symbol rate. PSK/QAM signals require a longer filter response as compared to GMSK to meet emissions mask specifications, and have higher peak to average power. This results in a longer delay through the radio and a lower average output power of a peak power limited amplifier.

Channel impulse response estimates made with GMSK are not directly compatible with a channel impulse response estimates made with PSK/QAM.

SUMMARY

In one aspect, embodiments of the inventive concepts disclosed herein are directed to a system and method for generating a channel estimate with GMSK and converting the GMSK channel estimate to one that can be used with PSK/QAM data and vice versa.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
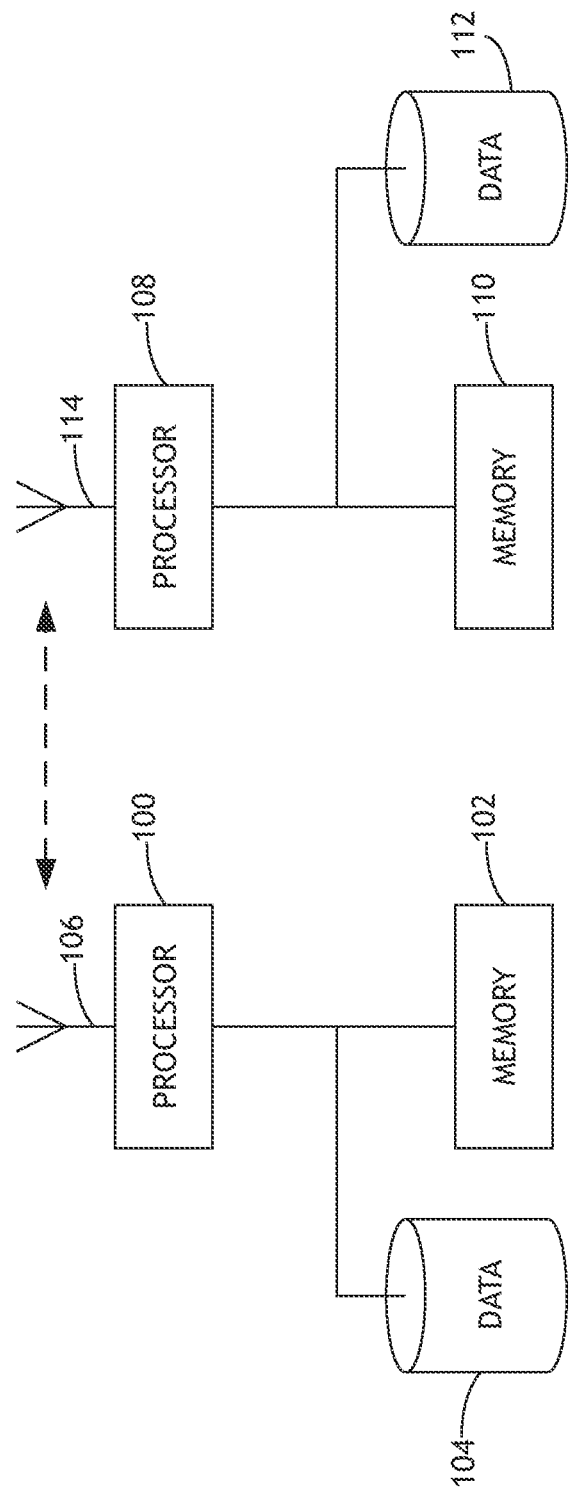
FIG. 1 shows a block diagram of a system for implementing an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for generating a channel estimate with GMSK and converting the GMSK channel estimate to one that can be used with PSK/QAM data and vice versa.

Referring to FIG. 1, a block diagram of a system for implementing an exemplary embodiment is shown. The system includes a processor 100, memory 102 connected to the processor 100 for storing processor executable code, and an antenna 106 for receiving and transmitting encoded signals. In at least one embodiment, the processor 100 may comprise filters, amplifiers, equalizers, and other signal processing hardware. During a decoding process, an equalizer is initialized via an estimate of a channel impulse response. The overall channel impulse response through a multipath channel is:

$$h(t)=C_0(t)*mp(t)$$

where: h(t) is the overall impulse response; $C_0(t)$ is the pulse shape filter; and mp(t) is the multipath channel impulse response.

The system may utilize an encoding and transmitting component having a processor 100, memory 102, and antenna 106; and a receiving and decoding component having a separate processor 108, memory 110, and antenna 114, and potentially a data storage element 112. It may be appreciated that each component may configured as a transmitting or receiving component as necessary. Each of the transmitting component and receiving component communicate to establish what the transmitter is going to transmit. The transmitting component determines a shift value, constructs a training sequence by combining a base sequence and circularly shifted version of the base sequence, and performs GMSK modulation of the training sequence as more fully described herein.

The receiving component then receives the GMSK modulated signal, determines a conversion filer to convert a GMSK channel estimate to a PSK/QAM channel estimate, computes an impulse response based on the GMSK modulated signal, and uses a converted impulse response to decode a PSK/QAM signal as more fully described herein.

For channel impulse response estimation, the processor 100 determines the impulse response by observing a segment of a received signal produced by a training sequence; in this exemplary embodiment, the training sequence has 2N binary symbols (or bits) and the channel memory is L symbol periods, where L is assumed to be an even integer, and the channel impulse response spans $L_S=L+1$. A data sequence is applied to an in-phase channel $a=[a_0\,a_1\,\ldots\,a_{N-1}]^T$ at 0, 2T, 4T, ..., 2(N−1)T. Similarly, a data sequence applied to the quadrature channel, offset by a symbol period, i.e., $b=[b_0\,b_1\,\ldots\,b_{N-1}]^T$, is applied at T, 3T, 5T, ..., (2N−1)T. A channel impulse vector, h, which has $N_C$=2D coefficients with T/2 tap-spacing, is the solution to:

$$(A^{*T}A)h=A^{*T}r$$

where:

$$A = \begin{bmatrix} a_0 & jb_{-1} & a_{-1} & \ldots & a_{-D/2} \\ jb_0 & a_0 & jb_{-1} & \ldots & jb_{-D/2} \\ a_1 & jb_0 & a_0 & \ldots & a_{-D+2} \\ \vdots & \vdots & \vdots & \vdots & \vdots \\ jb_{N-1} & a_{N-1} & \ldots & \ldots & jb_{N-D/2} \end{bmatrix}$$

and $$h = \begin{bmatrix} h_0 \\ h_{T/2} \\ h_T \\ h_{3T/2} \\ h_{2T} \\ \vdots \\ \vdots \\ h_{(2D-1)T/2} \\ h_{DT} \end{bmatrix}$$

with $R=A^{*T}A$, the data sequence autocorrelation matrix is an $L_s \times L_s$ matrix and the elements $r_{ii}$=2N for i=1, 2, ..., D. When j−i is non-zero and even, the $r_{ij}$ elements assume real values and can be expressed as:

$$r_{ij} = \sum_{k=0}^{N-1} a_{k+\varepsilon}a_k + \sum_{k=0}^{N-1} b_{k+\varepsilon}b_k = R_{aa}(\varepsilon) + R_{bb}(\varepsilon)$$

where $\varepsilon=(j-i)/2$. When $j-i \geq 1$ and odd, the $r_{ij}$ elements assume imaginary values and can be expressed as:

$$r_{ij} = j\left(\sum_{k=0}^{N-1} a_{k+\varepsilon}b_k - \sum_{k=0}^{N-1} b_{k+\varepsilon-1}a_k\right) = j(R_{ab}(\varepsilon) - R_{ba}(\varepsilon-1))$$

where $\varepsilon=((j-i)+1)/2$.

$R_{aa}(n)$ and $R_{bb}(n)$ are the circular autocorrelation functions of the a and b binary data sequences, which are periodically repeated. Similarly, $R_{a,b}(n)$ is the circular cross-correlation of the binary sequences, a and b. When $R_{ab}(n)$ and $R_{ba}(n+1)$ are constructed to be equal, the imaginary components of the complex valued data autocorrelation matrix, $R=A^{*T}A$, vanish.

The number of columns, $N_C$, in the R matrix is on the order of 6 for the 1-path additive white Gaussian noise channel and usually $N_C \leq 12$ for multipath conditions with 3 kHz channel bandwidths. Given that the a and b binary data sequences are each spaced by two symbol periods, the maximum value that ε can have is $D=N_C/2$ (i.e., 6 for a multipath channel). Therefore, if the sequence a is assigned to a binary m-sequence and the sequence b is a circularly shifted version of the a sequence with a shift value, $S=N_C/2$, the cross-correlation function is:

$$R_{ab}(n) = \begin{cases} N & \text{for } n = S \\ -1 & \text{otherwise} \end{cases}$$

With this sequence construction, the data autocorrelation matrix R, assumes real values and can be expressed as follows for $N_C=12$:

$$R = 2\begin{bmatrix} N & 0 & -1 & 0 & -1 & 0 & -1 & 0 & -1 & 0 & -1 & 0 \\ 0 & N & 0 & -1 & 0 & -1 & 0 & -1 & 0 & -1 & 0 & -1 \\ -1 & 0 & N & 0 & -1 & 0 & -1 & 0 & -1 & 0 & -1 & 0 \\ 0 & -1 & 0 & N & 0 & -1 & 0 & -1 & 0 & -1 & 0 & -1 \\ -1 & 0 & -1 & 0 & N & 0 & -1 & 0 & -1 & 0 & -1 & 0 \\ 0 & -1 & 0 & -1 & 0 & N & 0 & -1 & 0 & 0 & -1 & 0 \\ -1 & 0 & -1 & 0 & -1 & 0 & N & 0 & -1 & 0 & -1 & 0 \\ 0 & -1 & 0 & -1 & 0 & -1 & 0 & N & 0 & -1 & 0 & -1 \\ -1 & 0 & -1 & 0 & -1 & 0 & -1 & 0 & N & 0 & -1 & 0 \\ 0 & -1 & 0 & -1 & 0 & -1 & 0 & -1 & 0 & N & 0 & -1 \\ -1 & 0 & -1 & 0 & -1 & 0 & -1 & 0 & -1 & 0 & N & 0 \\ 0 & -1 & 0 & -1 & 0 & -1 & 0 & -1 & 0 & -1 & 0 & N \end{bmatrix}$$

which can be expressed as:

$$R = 2(N+1)\left[I - \frac{E}{N+1}\right]$$

with:

$$E = \begin{bmatrix} 101010101010 \\ 010101010101 \\ 101010101010 \\ 010101010101 \\ 101010101010 \\ 010101010101 \\ 101010101010 \\ 010101010101 \\ 101010101010 \\ 010101010101 \\ 101010101010 \\ 010101010101 \end{bmatrix}$$

Now $$E^2 = EE = \left(\frac{N_C}{2}\right)E = DE.$$

The covariance matrix of the noise on the channel impulse response estimate is:

$$\text{Cov}(h) = \sigma_n^2 R^{-1} = \frac{\left[I - \frac{E}{N+1}\right]^{-1}}{2(N+1)}$$

Now:

$$\left[I - \frac{E}{N+1}\right]^{-1} =$$

$$\sum_{k=0}^{\infty}\left(\frac{E}{N+1}\right)^k = I + \frac{E}{N+1}\left(\sum_{k=0}^{\infty}\left(\frac{D}{N+1}\right)^k\right) = I + \frac{E}{(N+1-D)}$$

Therefore, the data correlation matrix can be inverted as:

$$R^{-1} = \left(\frac{1}{2(N+1)}\right)\left(I + \frac{E}{(N+1-D)}\right)$$

The diagonal elements of this matrix are the channel impulse response noise power for each channel tap:

$$\sigma_h^2 = \left(\frac{1 + \frac{1}{(N+1-D)}}{2(N+1)}\right)\sigma_n^2 = \left(\frac{((N+1-D)+1)}{(2(N+1))(N+1-D)}\right)\sigma_n^2$$

In an alternative embodiment, I/Q sequences for GMSK sounding and channel estimation may be constructed from a base m-sequence, and a circularly shifted version with shift S:

$$\eta(2kn) = m_K(n) \text{ for } n=0:K-1$$

$$\eta(2kn+1) = jm_K(n-S) \text{ for } n=0:K-1$$

where $K=2^k-1$, K is the order of the m sequence, and the span of the sequence $\eta$ is 2K. A shift value:

$$S_{opt} = 2^{k-1}$$

yields a real-valued auto-correlation function:

$$R_{\eta\eta}(n) = \begin{cases} 2K & \text{for } n=0 \\ 0 & \text{for } n \le 2K-3 \ \& \ n \text{ odd} \\ -2 & \text{for } n \le 2K-2 \ \& \ n \text{ even} \end{cases}$$

For an impulse response span $L_s=7$ symbol periods and a base sequence of length $N=K$:

$$R_d = 2\begin{bmatrix} N & 0 & -1 & 0 & -1 & 0 & -1 \\ 0 & N & 0 & -1 & 0 & -1 & 0 \\ -1 & 0 & N & 0 & -1 & 0 & -1 \\ 0 & -1 & 0 & N & 0 & -1 & 0 \\ -1 & 0 & -1 & 0 & N & 0 & -1 \\ 0 & -1 & 0 & -1 & 0 & N & 0 \\ -1 & 0 & -1 & 0 & -1 & 0 & N \end{bmatrix}$$

This data autocorrelation matrix can be expressed, in general, as:

$$R_d = 2(N+1)\left[I - \frac{E}{N+1}\right]$$

$$E = \begin{bmatrix} 1 & 0 & 1 & 0 & 1 & 0 & 1 \\ 0 & 1 & 0 & 1 & 0 & 1 & 0 \\ 1 & 0 & 1 & 0 & 1 & 0 & 1 \\ 0 & 1 & 0 & 1 & 0 & 1 & 0 \\ 1 & 0 & 1 & 0 & 1 & 0 & 1 \\ 0 & 1 & 0 & 1 & 0 & 1 & 0 \\ 1 & 0 & 1 & 0 & 1 & 0 & 1 \end{bmatrix}$$

$$E^2 = EE = \left(\frac{L_s+1}{2}\right)E$$

In that case:

$$\left[I - \frac{E}{N+1}\right]^{-1} =$$

$$\sum_{k=0}^{\infty}\left(\frac{E}{N+1}\right)^k = I + \frac{E}{N+1}\left(\sum_{k=0}^{\infty}\left(\frac{\frac{L_s+1}{2}}{N+1}\right)^k\right) = I + \frac{E}{(N+1-(L_s+1)/2)}$$

and the data correlation matrix may be inverted to:

$$R_d^{-1} = \left(\frac{1}{2(N+1)}\right)\left(I + \frac{E}{((N+1)-(L_s+1)/2)}\right)$$

The diagonal elements of this matrix are the channel impulse response noise power on each channel tap:

$$\sigma_h^2 = \left(\frac{1 + \frac{1}{\left(N+1-\frac{L_s+1}{2}\right)}}{2(N+1)}\right)\sigma_n^2 = \left(\frac{\left(\left(N+1-\frac{L_s+1}{2}\right)+1\right)}{(2(N+1))\left(N+1-\frac{L_s+1}{2}\right)}\right)\sigma_n^2$$

The least squares CIR estimate can be expressed as:

$$\hat{h} = e_n + \beta E e_n$$

$$e_n = \frac{A^{*T}r}{2(N+1)}$$

$$\beta = \frac{1}{((N+1)-(L_s+1)/2)}$$

where $e_n$ is the normalized ensemble average vector. The E matrix has two distinct rows, so the computation of $E\,e_n$ involves two dot-products, each with $(L_s+1)/2$ non-zero values that are equal to negative one. This implies $(L_s+1)$ complex subtractions, which is equivalent to $2\,(L_s+1)$ real additions. This also implies that the vector $E\,e_n$ has only two distinct values that are interleaved throughout in a repetitive fashion. Scaling these two distinct complex elements by $\beta$ requires four real multiples, which is very computationally efficient.

If 7-bit m-sequences are used as the known baseline training sequence, the least-squares observation interval is $2N=14$ symbols in duration. With a CIR span of $L_s=9$, the impulse response noise variance is:

$$\sigma_h^2 = \left(\left(\frac{4}{3}\right)\left(\frac{1}{16}\right)\right)\sigma_n^2 = \frac{\sigma_n^2}{12} = \left(\frac{7}{6}\right)\frac{\sigma_n^2}{14}$$

This exceeds the noise power normalized by 2N by a factor of 1 and ⅙; an increase about 16.7%. If 15-bit m-sequences are used as the known training symbols, with $L_s=9$, the impulse response noise variance is:

$$\sigma_h^2 = \left(\left(\frac{12}{11}\right)\left(\frac{1}{32}\right)\right)\sigma_n^2 = \left(\frac{45}{44}\right)\frac{\sigma_n^2}{30}$$

This exceeds the noise power normalized by the least-squares observation interval of 30 by a factor of 1 and 1/44; an increase of about 2.3% (an improvement relative to the 7-bit m-sequence).

The processor 100 may construct a training sequence or reference a preconstructed training sequence from a data storage element 104. The best I/Q sequences for GMSK sounding and channel estimation can be constructed as a base m-sequence, and a circularly shifted version with shift S.

$$G(2kn-1)=m_L(n) \text{ for } n=1{:}L$$

$$G(2n)=jm_L(n-S) \text{ for } n=1{:}L$$

where $L=2^k-1$, and the span of the sequence G is 2L. In at least one embodiment, the sequence is an interleaved I and Q sequence, with indices starting at one instead of zero. In at least one embodiment, the shift value may be:

$$S_{opt}=2^{k-1}$$

with k=6, L=63, and length(G)=126, the optimum shift value is 32. In this case, the auto-correlation function (as in FIG. 2) can be expressed as:

$$R(n) = conv(G(n), conj(fliplr(G(n))))$$

$$R(n) = \begin{cases} 2L & \text{for } n = 0 \\ 0 & \text{for } n \le 2L-3 \,\&\, n \text{ odd} \\ -2 & \text{for } n \le 2L-2 \,\&\, n \text{ even} \end{cases}$$

Figure 2:
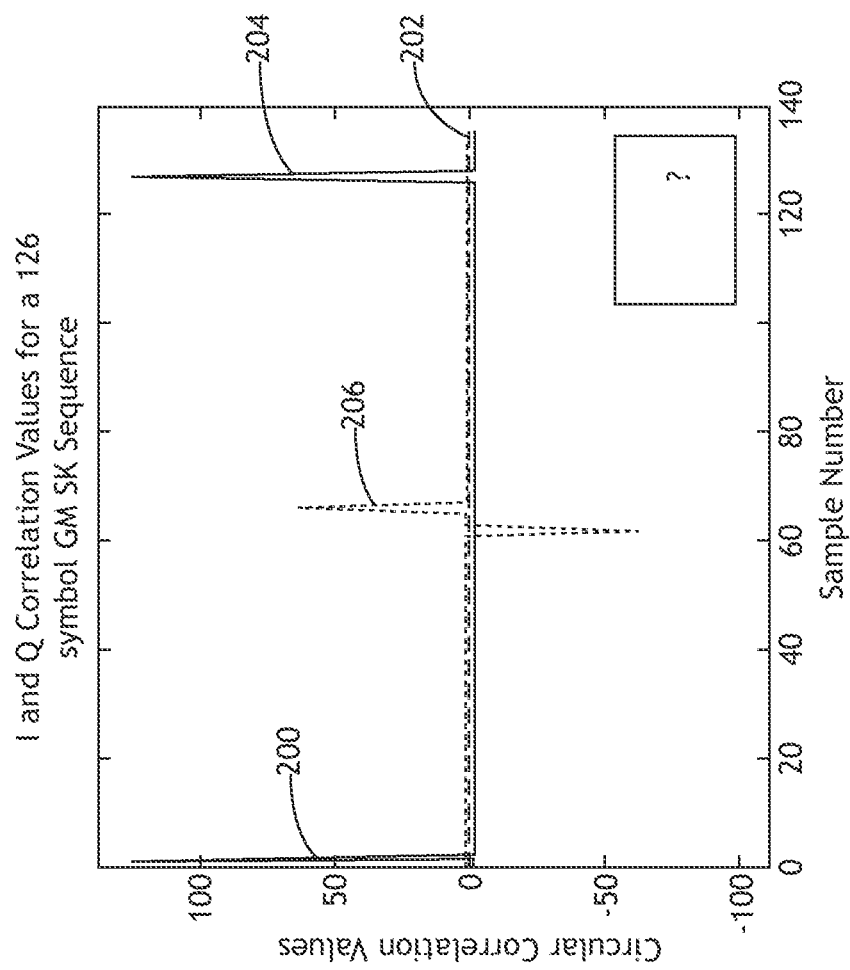
FIG. 2 shows a graph of I and Q correlations for a GMSK signal.

The auto-correlation function has an efficient linear square complex exponential (LSCE) technique. For k=6, L=63, and S=$S_{opt}$=32, the channel impulse response can span D=2 (L−1)=(124) symbol periods, which is a span of 4($S_{opt}$−1). When S=31, a significant quadrature side-lobe occurs at sample 61, which reduces the GMSK CIR span to 60 or in general, 2 (S−1). Because of degradation in delay spread handling, the optimal shift value should always be used when constructing sounding and known training sequences for GMSK. Referring to FIG. 2, a graph of I and Q correlations for a GMSK signal is shown. Channel impulse responses for an optimal (S=32) I sequence 200 and Q sequence 202 as compared to a suboptimal (S=31) I sequence 204 and Q sequence 206 illustrate the loss of delay spread capability associated with the suboptimal sequence.

In at least one embodiment, signals may employ a Barker code or Barker sequence. Barker sequences of length 7, 11, and 13 can be used in a similar fashion to m-sequences. When Barker-13 sequences are used to construct GMSK sounding sequences, the side-lobe is 2, which is the opposite of what occurs for m-sequences and other Barker lengths.

For Barker sequences of length B, the GMSK sounding signal duration is 2B. This provides GMSK sounding cycle options that are 22 symbols and 26 symbols, which are very close to the 25 symbol span of the Frank-25 sequence commonly used for optimal channel estimation for HF signals that occupy 3 kHz of channel bandwidth.

The optimal offset is (B+1)/2, and the CIR span is 2B−1. A suboptimum shift that is only one symbol less that the optimal value supports a CIR span of 2 (S−1), which is B−3. This is a dramatic reduction in the CIR span (i.e., more than a factor of 2.5).

A Barker-7 or m-7 sequence used with GMSK sounding permits a sounding cycle whose duration is 14 and supports a CIR of 13 symbols (5.4 ms). For 3 kHz channels, an optimum GMSK sounding signal with a duration of 14 symbols can be constructed from a k=3 (m-7) sequence for in-phase symbols and the quadrature component from the same m-sequence with a shift of 4 symbols. In this case, N=14 and D=3 for single path AWGN channels:

$$\sigma_h^2 = \left( \frac{((N+1-D)+1)}{(2(N+1))(N+1-D)} \right) \sigma_n^2 \sim \frac{\sigma_n^2}{27.7}$$

Alternatively, a Barker-11 sequence may have the property:

barker_11=[1 1 1−1−1−1 1−1−1 1−1]

For Barker sequences of length B:

$S_{opt}=(B+1)/2$

Legendre sequences whose lengths are prime (p) with mod (p,4)=3 also have circular autocorrelations functions with −1 off-peak values. When mod(p, 4)=3, the Legendre sequences have the same symbol pattern as time-reversed and shifted quadratic residue sequences. The legendre_11 sequence differs from the Barker-11 sequence in its ninth symbol, which is +1 instead of −1:

legendre_11=[1 1 1−1−1−1 1−1+1 1−1]

The following Legendre sequences are appropriate for the efficient GMSK least-squares channel impulse response estimation scheme:

legendre_19=[1 1−1−1 1 1 1 1 1−1 1−1 1−1−1−1−1 1 1−1]

legendre_23=[1 1 1 1 1−1 1−1 1 1 1−1−1 1 1−1−1 1−1 1−1−1−1−1]

legendre_31=m_31

For base sequence lengths up to 127, there are Legendre sequences of length 43, 47, 59, 67, 71, 79, 83, 103, 107 and 127 which have periodic autocorrelation functions whose off-peak values are −1. For all of these sequences, the optimum shift value is:

$S_{opt}=(p+1)/2$

In an alternative embodiment, a Barker-13 sequence has a periodic autocorrelation function where all of the off-peak values are 1. When Barker-13 sequences are used to construct GMSK sounding sequences, the sidelobes of the sequence η is +2, which is the opposite of what occurs for m-sequences and Barker sequences of other lengths. In this case:

$$R_d = 2(N-1)\left[I + \frac{E}{N-1}\right]$$

and the inverse of the data autocorrelation matrix is:

$$R_d^{-1} = \left(\frac{1}{2(N-1)}\right)\left[I + \frac{E}{N-1}\right]^{-1}$$

Furthermore:

$$\left[I + \frac{E}{N-1}\right]^{-1} = \sum_{k=0}^{\infty}\left(\frac{-E}{N-1}\right)^k = I -$$

$$\left(\frac{E}{N-1}\right)\left[1 - \left(\frac{\frac{L_s+1}{2}}{N-1}\right) + \left(\frac{\frac{L_s+1}{2}}{N-1}\right)^2 - \ldots \right]$$

$$= I - \left(\frac{E}{N-1}\right)\left[\sum_{k=0}^{\infty}\left(\frac{-\left(\frac{L_s+1}{2}\right)}{N-1}\right)^k\right] =$$

$$I - \left(\frac{1}{N-1+\left(\frac{L_s+1}{2}\right)}\right)$$

The least squares CIR estimate can be expressed as:

$$\hat{h} = e_n + \beta E e_n$$

$$e_n = \frac{A^{*T}r}{2(N+1)}$$

$$\beta = \frac{1}{((N+1)-(L_s+1)/2)}$$

Post ensemble average, the CIR can be computed with four real multiples and 2 ($L_s$+1) real subtractions, which is computationally efficient.

Having a positive sidelobe like the Barker-13 sequence, instead of a negative sidelobe, improves CIR estimation accuracy, as shown by:

$$\sigma_h^2 = \left( \frac{1 - \frac{1}{\left((N-1)+\frac{L_s+1}{2}\right)}}{2(N+1)} \right)\sigma_n^2 = \left( \frac{\left(N-2+\frac{L_s+1}{2}\right)}{\left(N-1+\frac{L_s+1}{2}\right)} \right)\sigma_n^2$$

For a Barker-11 sequence, estimating a CIR that spans $L_s$=9 symbols has a CIR tap noise power of:

$$\sigma_h^2 = \left(\left(\frac{8}{7}\right)\left(\frac{1}{24}\right)\right)\sigma_n^2 = \left(\frac{22}{21}\right)\frac{\sigma_n^2}{22} = 0.0476\,\sigma_n^2$$

This exceeds the CIR noise power, normalized by 2N, by a factor of 1 1/21; an increase of about 4.8%.

For a Barker-13 sequence, estimating a CIR that spans L_s=9 symbols has a CIR tap noise power of:

$$\sigma_{\tilde{h}}^2 = \left(\left(\frac{16}{17}\right)\left(\frac{1}{24}\right)\right)\sigma_n^2 = \left(\frac{52}{51}\right)\frac{\sigma_n^2}{26} = 0.0392\,\sigma_n^2$$

This exceeds the CIR noise power, normalized by 2N, by a factor of 1 1/51; an increase of less than 2%. Ideally, it is desirable to have more sequences with a periodic autocorrelation with off-peak values equal to +1.

The equalizer loss factor which takes into account the impact of using noisy impulse response estimates to initialize the equalizer is:

$$L_{EQ} = 10\log\left(1 + \frac{L_o + 3}{27.7}\right) dB$$

for a single-path AWGN channel, $L_o=3$ and $L_{EQ}\sim 0.85$ dB. For a PSK/QAM data transmission phase, the channel impulse response that is required for equalization is:

$$h_Q(t) = h_T(t) * mp(t) * h_R(t)$$

where $h_Q(t)$ is the overall impulse response for PSK/QAM, $h_T(t)$ is the transmit filter response, mp(t) is the multipath channel impulse response, $h_R(t)$ is the receive filter response.

The conversion from the GMSK channel impulse response obtained during the sounding phase to the PSK/QAM channel impulse response requires a conversion filter, which satisfies:

$$g(t) * C_o(t) = h_T(t)$$

If X is the span of $C_o(t)$ in symbol periods, the number of taps in $C_o(t)$ is $N_{Cnot}=X$ spb+1. If Z is the span of $h_T(t)$ in symbol periods. The number of taps in $h_T(t)$ is $N_{hT}=Z$ spb+1. This implies that the number of taps in the conversion filter is $N_g = N_{hT} - N_{Cnot} + 1$.

Coefficients of the conversion filter, $\vec{g}$, may be found according to the follow process. The GMSK tap coefficient vector can be expressed as:

$$\vec{Cnot} = [c(o)c(1)c(2) \ldots c(N_{Cnot}-1)]^T$$

$$\vec{C}_{ext} = [\vec{Cnot}\vec{0}_{nz}]^T$$

$$nz = N_{hT} - N_{Cnot}$$

and the convolution can be expressed as:

$$C\vec{g} = \vec{h}_T$$

$$C = [\vec{C}_{ext}\vec{C}_{ext}(s_1)\vec{C}_{ext}(s_2) \ldots \vec{C}_{ext}(s_{Ng-1})]$$

$\vec{C}_{ext}(s_k)$ is a circular shift down $k$ samples of $\vec{C}_{ext}$

Here the C matrix is $N_{hT} \times N_g$, $\vec{g}$ is a column vector with $N_g$ elements, and $\vec{h}_T$ is a column vector of dimension $N_{hT}$. The easiest way to solve for $\vec{g}$ is to pre-multiply both sides of the equation above by the conjugate transpose of C (i.e., $C^H$) and solve:

$$\vec{g} = (C^H C)^{-1} C^H \vec{h}_T$$

Since $C_o(t)$ and $h_T(t)$ are known a priori, the taps of the conversion filter can be precomputed.

Figure 3:
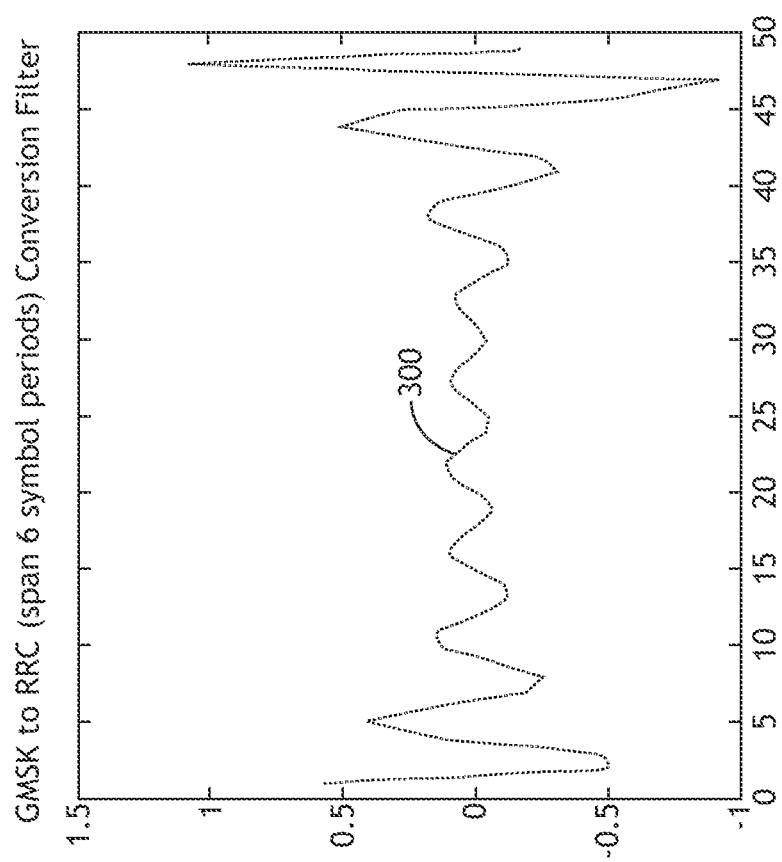
FIG. 3 shows a graph of GMSK to root raised cosine pulse (RRC) conversion filter taps according to an exemplary embodiment.
Figure 4:
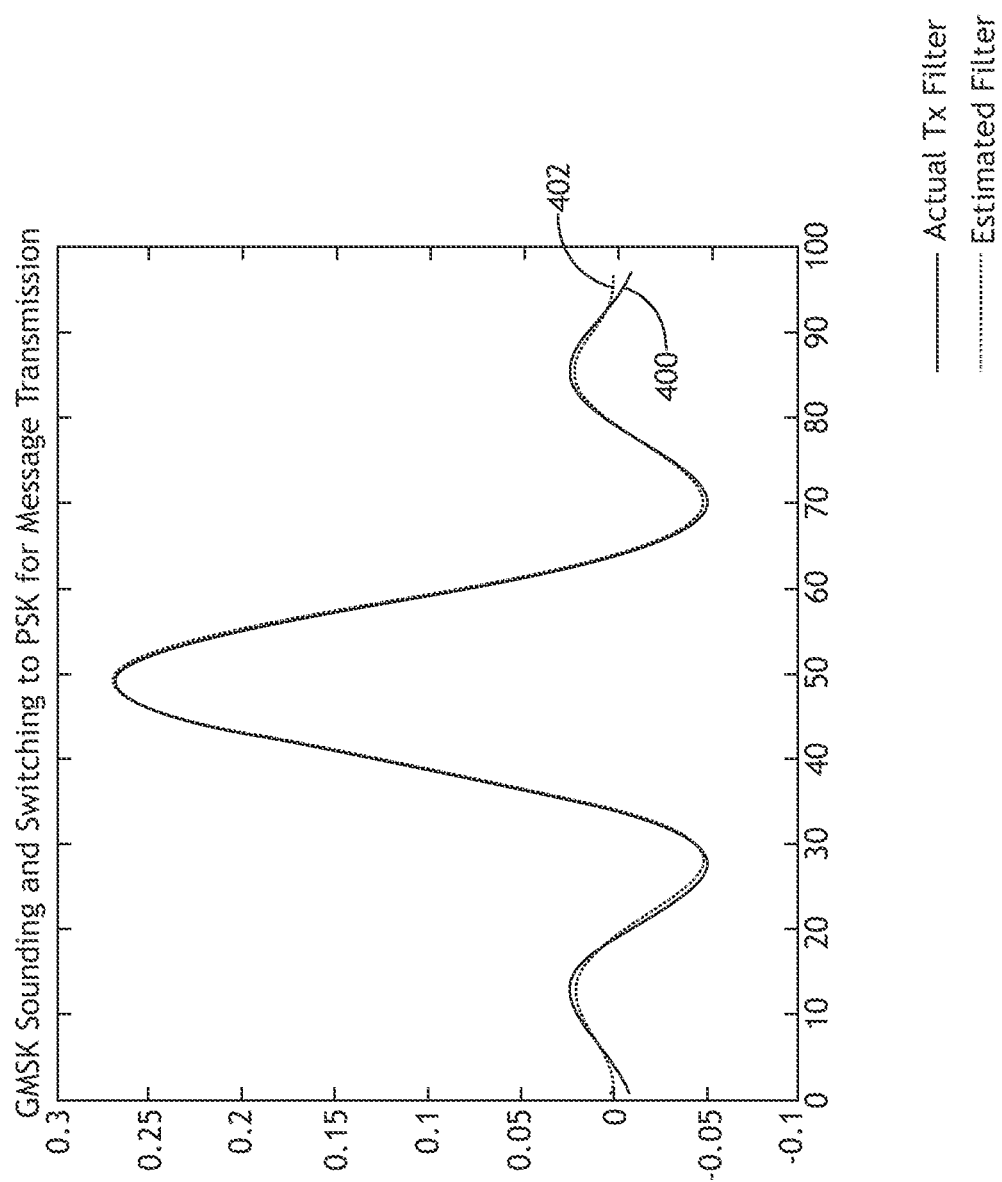
FIG. 4 shows a graph of an estimated transmit pulse shape versus actual RRC pulse shape according to an exemplary embodiment.
Figure 5:
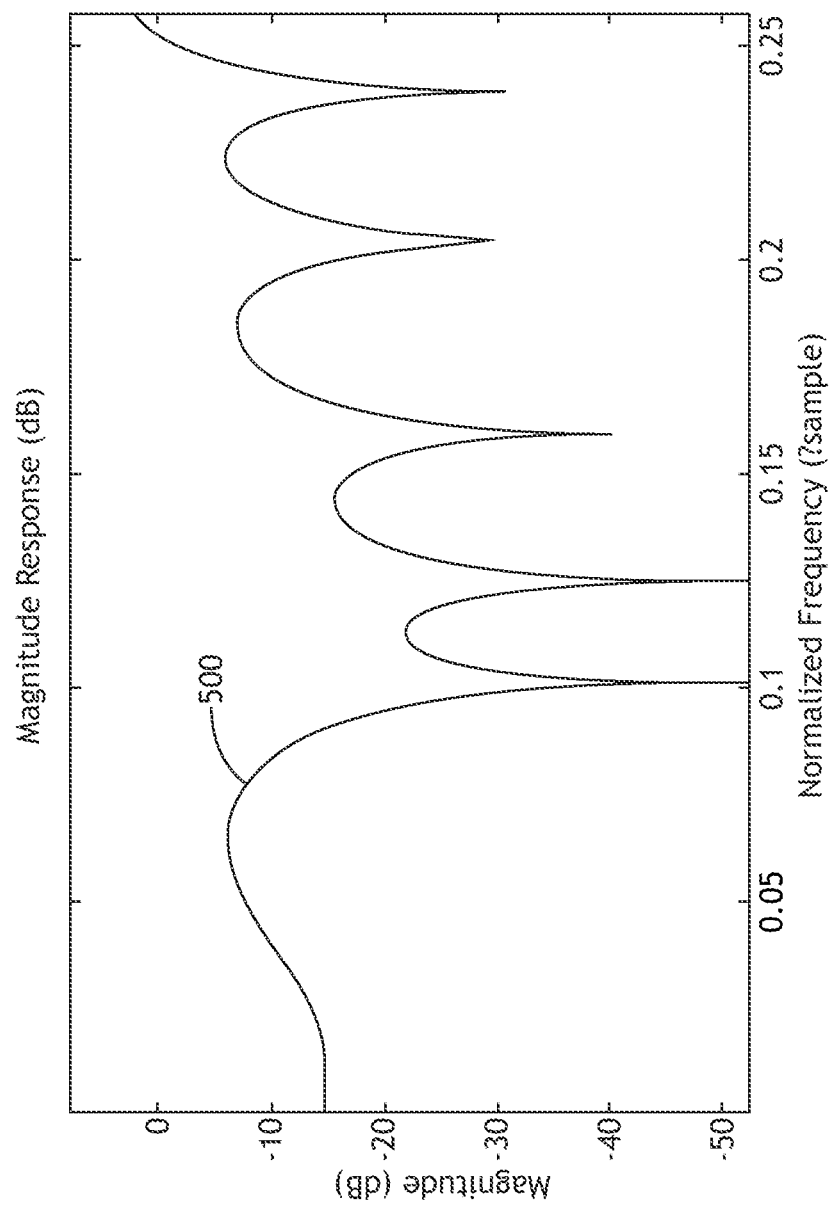
FIG. 5 shows a graph of conversion filter frequency responses according to an exemplary embodiment.

In at least one embodiment, the processor applies Root raised cosine pulse (RRC) shaping filters the GMSK signal. RRC shaping filters may be used for wideband HF waveform implementations. Referring to FIG. 3, taps 300 of the shaping filter for converting a GMSK channel impulse response into one appropriate for a RRC filter, spanning 6 symbol periods is shown. Such span may be useful for an equalizer implementing PSK/QAM data communications. Referring to FIG. 4, an estimated transmit pulse shape 402 and the actual RRC pulse shape 400 are shown. The fit quality is very good with overall rms fit error of 0.028 (−31.05 dB). Referring to FIG. 5, the frequency response 500 of the conversion filter over the channel bandwidth is shown.

Figure 6:
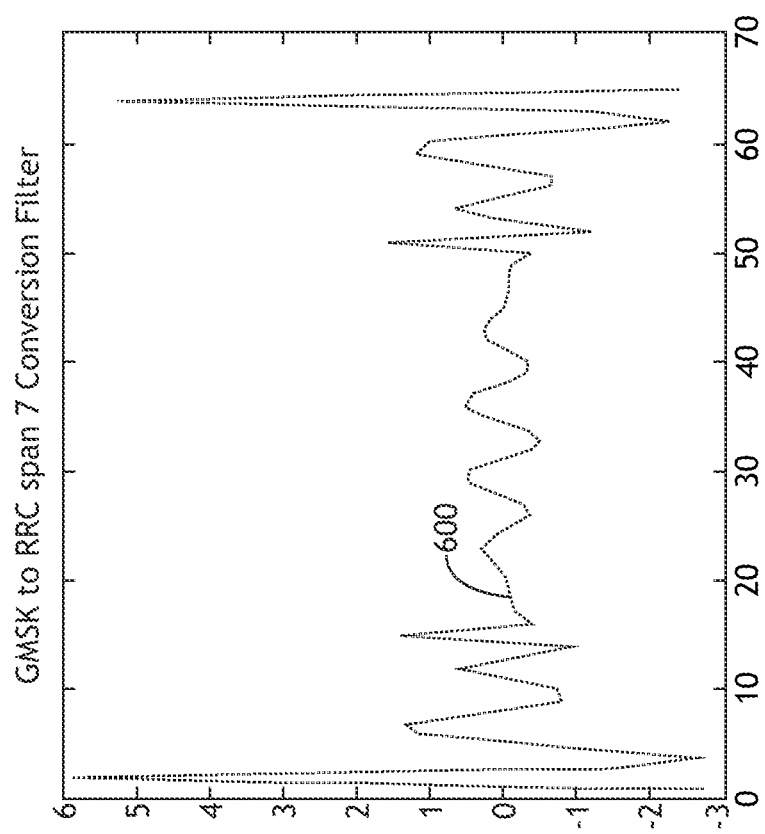
FIG. 6 shows a graph of GMSK to RRC conversion filter taps according to an exemplary embodiment.
Figure 7:
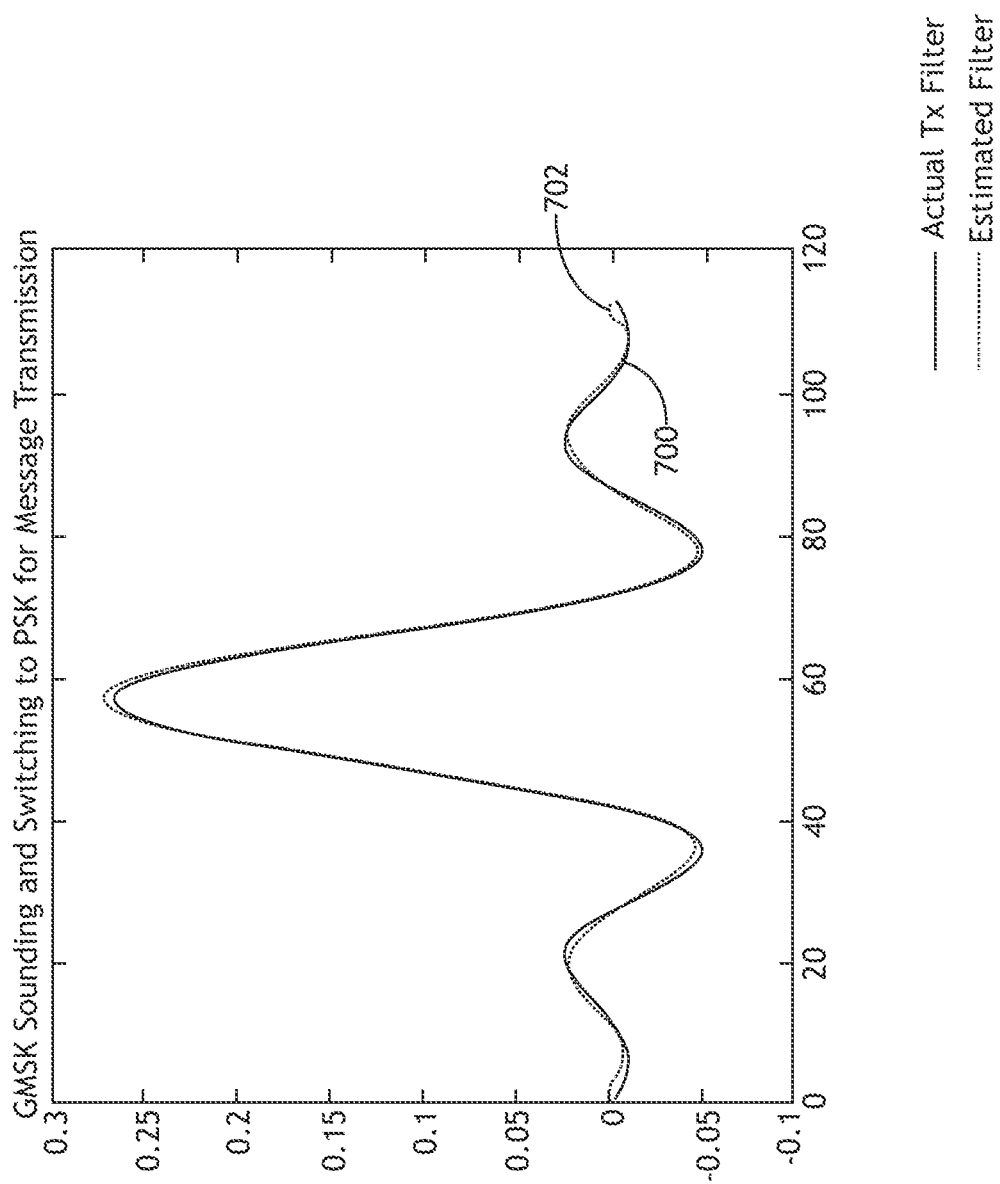
FIG. 7 shows a graph of an estimated filter coefficients versus and actual filter coefficients according to an exemplary embodiment.
Figure 8:
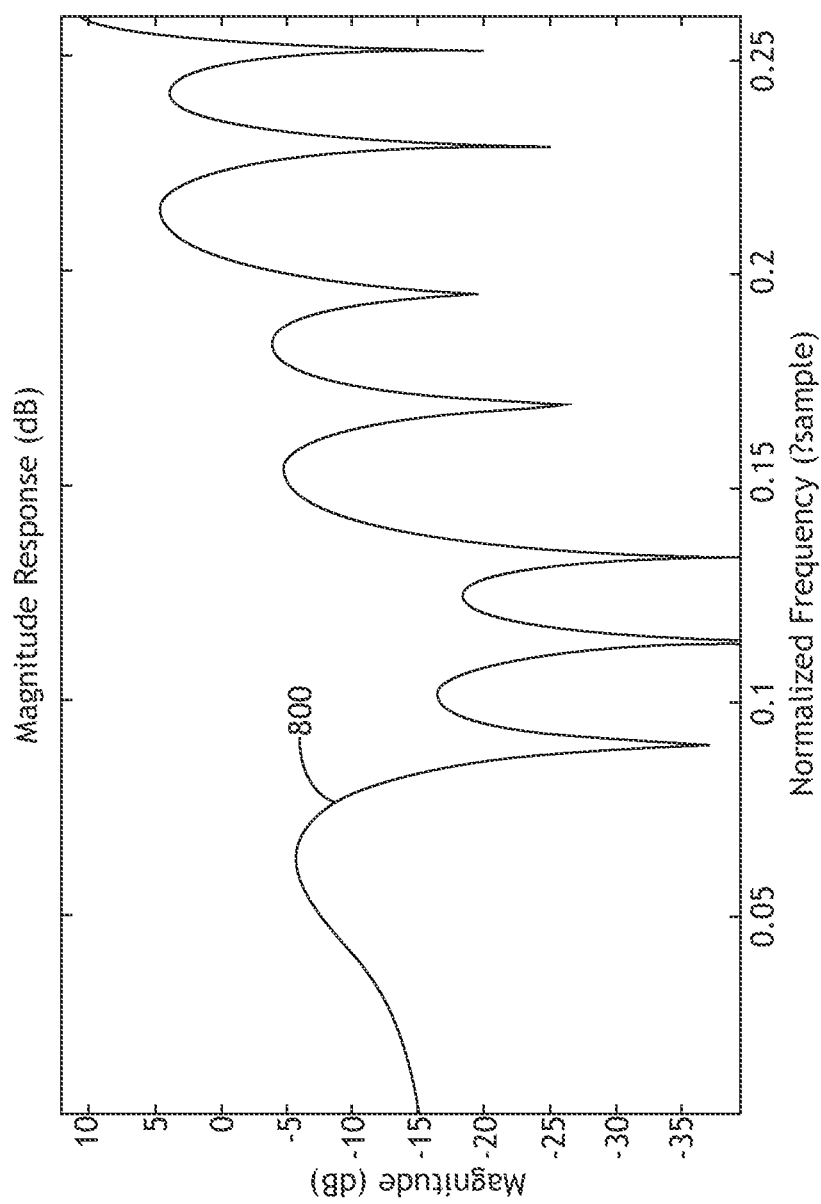
FIG. 8 shows a graph of conversion filter frequency responses according to an exemplary embodiment.

Alternatively, referring to FIG. 6, taps 600 for a conversion filter from GMSK CIR to one appropriate for PSK/QAM equalization for a RRC pulse shape filter spanning 7 symbol periods are shown. In such embodiment, referring to FIG. 7, the estimated transmit pulse shape 700 and the RRC pulse shape 702 are shown. The fit quality is very good with overall rms fit error of 0.0274 (−31.25 dB). Referring to FIG. 8, the frequency response 800 of the conversion filter over the channel bandwidth is shown.

Initialization of a GMSK equalizer requires knowledge of channel impulse response for GMSK signaling. The channel impulse response that the equalizer sees is the convolution of the transmit filter, most likely a RRC response, and the receive filter along with the multipath channel impulse response, i.e.:

$$h_Q(t) = h_T(t) * mp(t) * h_R(t)$$

To equalize GMSK, the channel impulse response corresponds to:

$$h_G(t) = C_o(t) * mp(t) * h_R(t)$$

This can be accomplished with a conversion filter, (t), that with the property:

$$z(t) * h_T(t) = C_o(t)$$

GMSK is a binary signaling scheme and has a very short channel impulse response span. Linearized GMSK with a BT=0.6, and L=2 gives a GMSK pulse shape span of 3 symbol periods. To increase dimensionality, linearized GMSK with the same time bandwidth product is used but with L=3, which extends the GMSK pulse shape span to 4 symbol periods. The dimensionality of the GMSK pulse shape can be increased further by adding 16 zero samples before and after the GMSK pulse shape. This increases the span of the GMSK pulse shape to 6 symbol periods, which will have 97 filter coefficients.

Figure 9:
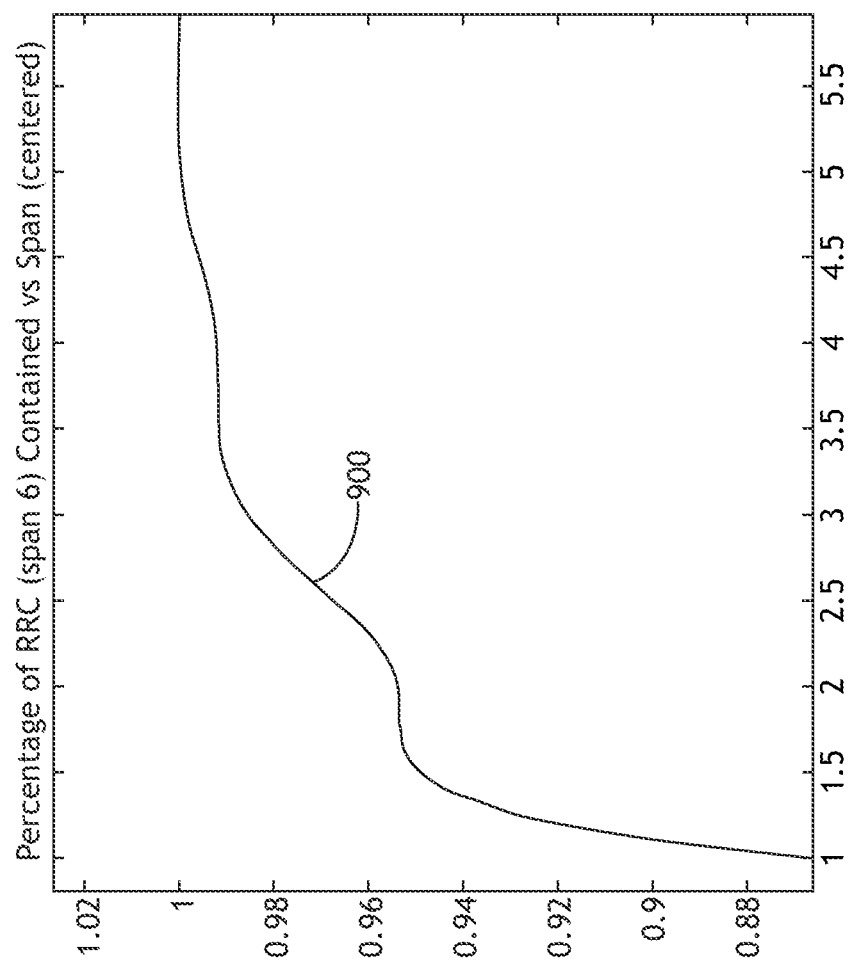
FIG. 9 shows a graph of percentage of energy as a function of transmit filter span.

In at least one embodiment, the transmit filter is a 25% roll-off RRC filter spanning 6 symbol periods. Referring to FIG. 9, the relationship 900 between contained RRC and span indicates that over 99% of the energy in the transmit filter is contained in 4 symbol periods. Consequently, for determining the GMSK CIR, the Tx filter response is limited to 3% symbol periods, and normalized to unit energy. This reduces the number of PSK taps to 61. Shortening of the pulse shape response is common when equalizing wideband HF waveforms using PSK modulation. CIR's with large spans are needed for high order QAM modulations.

If X is the span of a truncated $h_T(t)$ in symbol periods, and the number of coefficients is $N_{psk}=X$ spb+1; and if Z is the span of $C_o(t)$ in symbol periods and the number of coefficients is $N_{gmsk}=Z$ spb+1, that implies that the number of taps in the conversion filter, z(t), is $N_z = N_{gmsk} - N_{psk} + 1$. In at least one embodiment, $N_{psk}=65$, $N_{gmsk}=97$, and $N_z=37$.

In at least one embodiment, solving for the coefficients of the conversion vector, $\vec{z}$, is described herein. The PSK tap coefficient vector, in column form, can be expressed as:

$$\vec{h}_T = [h_T(0) h_T(1) h_T(2) \ldots h_T(N_{psk}-1)]^T$$

$$\vec{h}_{T_{ext}} = [\vec{h}_T \vec{0}_{nz}]^T$$

where $nz = N_{gmsk} - N_{psk}$, and $\vec{0}_{nz}^T$ is a column vector containing nz zeros. The convolution process outlined above can be expressed in matrix form as:

$$A\vec{z} = \vec{C}_o$$

where the matrix A has a series of $N_z = nz+1$ column vectors, each with $N_{psk}$ elements such that:

$$A = [\vec{h}_{T_{ext}} \vec{h}_{T_{ext}}(s_1) \vec{h}_{T_{ext}}(s_2) \ldots \vec{h}_{T_{ext}}(s_{nz})]$$

The first column of the A matrix is the extended $\vec{h}_{T_{ext}}$ column vector, and each subsequent column is a circular shift down one sample of its predecessor, i.e.:

$$\vec{h}_{T_{ext}}(s_k) \text{ is a circular shift down } k \text{ samples of } \vec{h}_{T_{ext}}.$$

A is an $N_{psk} \times N_z$ matrix, $\vec{z}$ is a column vector with $N_z$ elements, and $\vec{C}_o$ is a column vector of dimension $N_{gmsk}$ that contains the taps of the extended GMSK pulse shape filter.

In at least one embodiment, solving for $\vec{z}$ comprises pre-multiplying both sides of the equation, $A\vec{z} = \vec{C}_o$ by the conjugate transpose of A (i.e., $A^H$) and solving:

$$\vec{z} = (A^H A)^{-1} A^H \vec{C}_o$$

Because $C_o(t)$ and $h_T(t)$ are known a priori, the taps of the conversion filter can be precomputed.

The process described above is the solution to a least squares estimation problem. The taps of the conversion filter, $\vec{z}$, minimizes the squared distance between the ideal GMSK pulse shape, $\vec{C}_o$, and its estimate given by the convolution of the truncated $\vec{h}_T$ and the conversion filter, i.e.:

$$\widehat{\vec{C}_o} = \text{conv}(\vec{h}_T, \vec{z})$$

It may be appreciated that the foregoing exemplary embodiments describe construction of a special training sequence specific to GMSK; however, many of the principles described are applicable to PSK/QAM. PSK/QAM signals may be received and a PSK/QAM channel estimate converted to one that is appropriate for GMSK. The receiving component receives a signal with PSK training data and GMSK data, computes a channel impulse response estimate from the PSK training data, converts that estimate to one appropriate for GMSK with a conversion filter, and uses the estimate in the detection of the GMSK data, for example via equalizer or RAKE receiver.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising at least one processor in data communication with a memory storing processor executable code for configuring at least one processor to:
   in a transmit mode:
      select a shift value S;
      construct a training sequence by combining a base sequence and a circularly shifted version of the base sequence with the shift value S; and
      transmit a GMSK modulated signal including the training sequence; and
   in a receive mode:
      precompute a conversion filter to convert a GMSK channel estimate to a PSK/QAM channel estimate;
      receive a GMSK modulated signal;
      compute an impulse response based on the GMSK modulated signal;
      receive a PSK/QAM signal;
      apply the conversion filter to the impulse response; and
      use the converted impulse response to decode the PSK/QAM signal.

2. The computer apparatus of claim 1, wherein the training sequence comprises a sequence having a periodic autocorrelation function with constant off-peak values.

3. The computer apparatus of claim 1, wherein the shift value S is defined by $S = N_C/2$.

4. The computer apparatus of claim 1, wherein the training sequence is defined by:

$$G(2kn-1) = m_L(n) \text{ for } n=1:L$$

$$G(2n) = jm_L(n-S) \text{ for } n=1:L.$$

5. The computer apparatus of claim 1, wherein the shift value S is defined by $2^{k-1}$.

6. The computer apparatus of claim 1, wherein the at least one processor is further configured to:
   use the GMSK channel estimate in an equalization process to detect the PSK/QAM signal.

7. The computer apparatus of claim 1, wherein the conversion filter is computed by $\vec{g} = (C^H C)^{-1} C^H \vec{h}_T$.

8. The computer apparatus of claim 1, wherein the training sequence comprises 2N binary symbols, and a channel memory is an even integer L of symbol periods.

9. The computer apparatus of claim 8, wherein the impulse response spans L+1 symbols.

10. A method for applying GMSK impulse response to a PSK/QAM signal comprising:
    selecting a shift value S;
    constructing a training sequence by combining a base sequence and a circularly shifted version of the base sequence with the shift value S;
    precomputing a conversion filter to convert a GMSK channel estimate to a PSK/QAM channel estimate;
    receiving a GMSK modulated signal;
    computing an impulse response based on the GMSK modulated signal;
    receiving a PSK/QAM signal while referring to the constructed training sequence;
    applying the conversion filter to the impulse response; and
    using the converted impulse response to decode the PSK/QAM signal.

11. The method of claim 10, wherein the shift value S is defined by $S = N_C/2$.

12. The method of claim 10, wherein the training sequence is defined by:

$$G(2kn-1) = m_L(n) \text{ for } n=1:L$$

$$G(2n) = jm_L(n-S) \text{ for } n=1:L.$$

13. The method of claim 8, wherein the shift value S is defined by $2^{k-1}$.

14. The method of claim 10, further comprising using the GMSK channel estimate in a RAKE receiver.

15. The method of claim 10, wherein the conversion filter is computed by $\vec{g} = (C^H C)^{-1} C^H \vec{h}_T$.

16. The method of claim 10, wherein the training sequence comprises 2N binary symbols, and a channel memory is an even integer L of symbol periods.

17. The method of claim 16, wherein the impulse response spans L+1 symbols.

18. A receiver comprising at least one processor in data communication with a memory storing processor executable code for configuring at least one processor to:
   precompute a conversion filter to convert a PSK/QAM channel estimate to a GMSK channel estimate;
   receive a GMSK signal;
   compute an impulse response based on the GMSK signal;
   receive a GMSK signal;
   apply the conversion filter to the impulse response; and
   use the converted impulse response to decode the GMSK signal.

19. The receiver of claim 18, wherein the conversion filter is computed by $\vec{z} = (A^H A)^{-1} A^H \vec{C}_o$.

20. The receiver of claim 18, wherein decoding the GMSK signal comprises detecting GMSK data via an equalizer or RAKE receiver.

* * * * *